United States Patent [19]
Verhein et al.

[11] 3,964,623
[45] June 22, 1976

[54] PALLET-PALLETIZER ASSEMBLY

[76] Inventors: Gene D. Verhein, 2435 Mill Road; Donald Verhein, 2116 Peninsula Road, both of Oconomowoc, Wis. 53066

[22] Filed: Feb. 12, 1975

[21] Appl. No.: 549,298

[52] U.S. Cl. .............................. 214/310; 108/55; 214/6 P; 214/38 CC
[51] Int. Cl.[2] ........................................ B65G 47/04
[58] Field of Search .................. 214/38 CC, 89, 6 P, 214/310, 621; 108/51, 55

[56] References Cited
UNITED STATES PATENTS

| | | | |
|---|---|---|---|
| 2,906,405 | 9/1959 | Erickson ........................ | 214/621 X |
| 3,426,878 | 2/1969 | Campbell et al. .......... | 214/38 CA X |
| 3,578,184 | 5/1971 | Schaich ........................ | 214/310 X |
| 3,756,436 | 9/1973 | Lingg ............................ | 214/310 X |

*Primary Examiner*—Robert G. Sheridan
*Attorney, Agent, or Firm*—Ronald E. Barry

[57] ABSTRACT

A pallet palletizer apparatus for handling lightweight air cargo containers, the apparatus including a slave pallet and a palletizer. The slave pallet includes a supporting surface for providing maximum contact with the bottom of the containers, enclosed tine ways for receiving the tines of a fork lift truck and pipe rail guards to protect the container overhang from damage. The palletizer includes a plurality of roller assemblies mounted in spaced parallel rows on a frame to allow for seating of the slave pallet in the spaces between the roller assemblies and the palletizer. Pallet guides are provided on the palletizer for aligning the slave pallet and container with the air cargo conveyor system.

7 Claims, 4 Drawing Figures

U.S. Patent June 22, 1976 Sheet 2 of 2 3,964,623
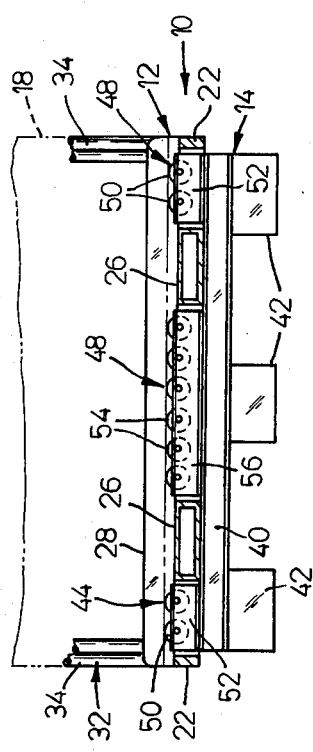
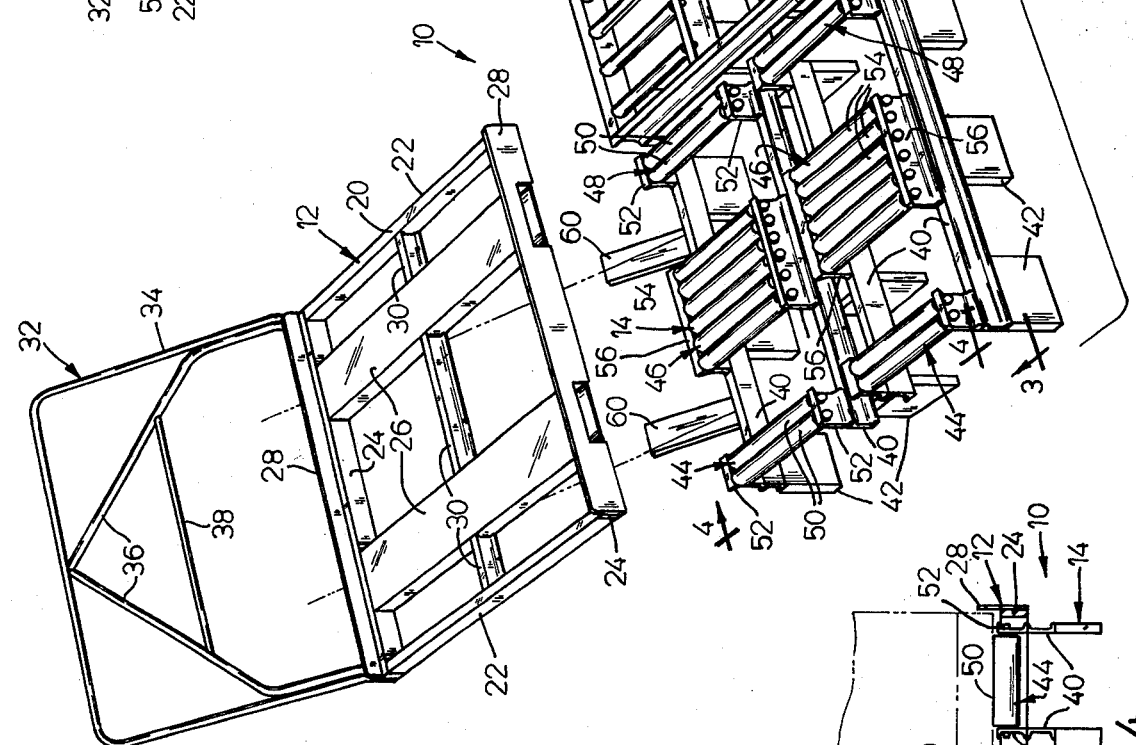
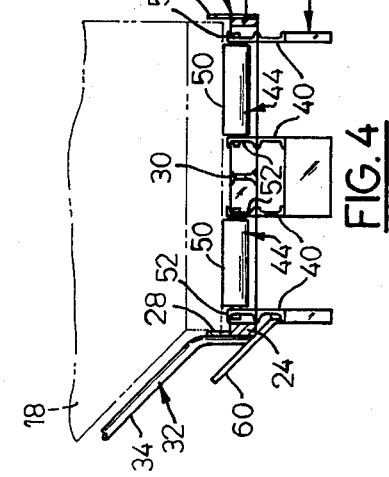

PALLET-PALLETIZER ASSEMBLY

BACKGROUND OF THE INVENTION

Transportation of cargo by airplane requires lightweight containers to reduce cargo weight. The containers are generally made of a lightweight metal such as aluminum which is easily damaged if improperly handled. This type of container can be sealed when loaded which minimizes theft during transfer and storage. The sealed container also reduces the number of containers that have to be handled by the shippers. Since the cost of the containers is high and the cost of repairing a damaged container approaches the cost of the new container, it has become extremely important that exposure to damage be minimized.

Most shippers and consignees do not have transporting equipment to move the lightweight containers without damage. The containers are generally transported by fork lift trucks. Most damage occurs when a container is picked up by a fork lift truck. In this regard, roller type pallets have been used to protect the bottom of the container. Since the palletized containers are transported by fork lift truck and highway trucks, any bump or jolt in the movement of the truck results in the indentation of the rollers of the pallet into the bottom of the container producing a washboard configuration. Once indented it becomes difficult to move the containers on roller type conveyor systems. The containers are also designed to closely fit within the air craft and it is, therefore, important that they are properly aligned on the air craft conveyor system so that they do not come in contact with the walls of the aircraft or the adjacent containers when they are moved into and out of the aircraft.

SUMMARY OF THE INVENTION

The pallet palletizer assembly of the present invention provides for maximum protection of the container in movement to and from the conveyor system. The assembly includes a slave pallet which provides maximum area contact with the bottom surface of the container and prevents movement of the container with respect to the pallet in movement to and from the palletizer. The container is also protected from damage from the tines of a fork lift truck by providing a pair of enclosed tine ways in the pallet to receive the tines of the fork lift truck. The palletizer includes a plurality of roller assemblies spaced to define a pair of slots corresponding to the spacing of the tine ways on the slave pallet. The rollers on the roller assemblies are located at a height slightly greater than the thickness of the tine ways on the slave pallet. With this arrangement, the container will rest on the rollers of the roller assembly when the pallet is seated in the palletizer and can be moved from the palletizer with little or no inconvenience. The container is positively aligned with the aircraft conveyor system by providing guides on the palletizer to locate the slave pallet on the palletizer.

DRAWINGS

FIG. 2 is an exploded view of the pallet palletizer assembly;

FIG. 3 is a view taken on line 3—3 of FIG. 2 showing the palletizer with the pallet seated in the palletizer and the container resting on the roller assemblies of the palletizer;

FIG. 4 is a view taken on line 4—4 of FIG. 2 showing the palletizer with the pallet partially broken away to show the alignment of the pallet with one edge of the palletizer.

DESCRIPTION OF THE INVENTION

Figure 1:
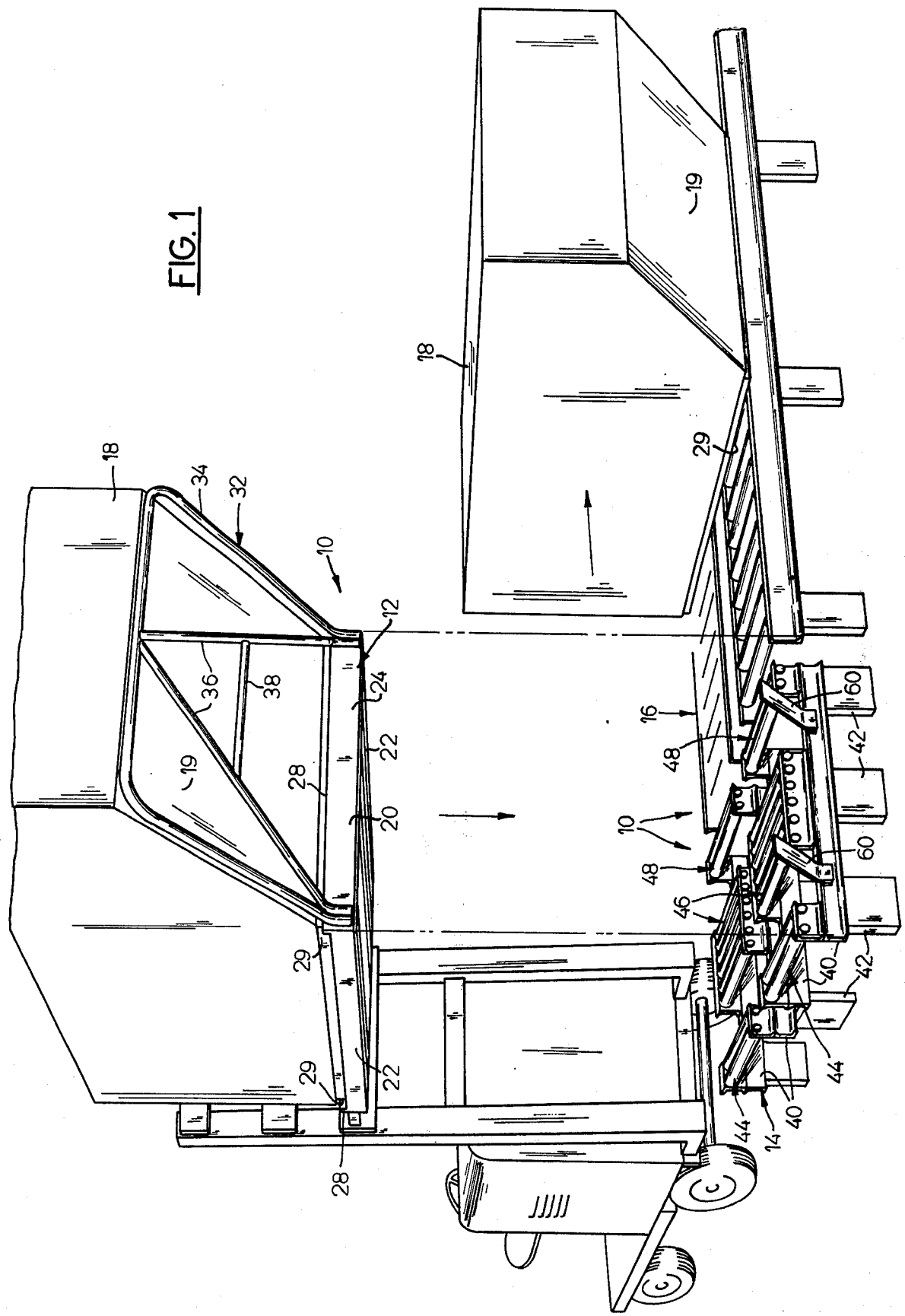
FIG. 1 is a perspective view of the pallet palletizer assembly showing the slave pallet supported on the tines of a fork lift truck in a position to be seated on the palletizer.

As seen in FIG. 1, the pallet-palletizer assembly 10 of the present invention is used to load or unload a container 18 into or out of an air cargo terminal or shipper or receivers warehouse. The assembly 10 generally includes a slave pallet 12 and a palletizer 14. The palletizer 14 is adapted to be positioned at the end of a conveyor system 16 which is used to transport the conveyor in the terminal. The conveyor system 16 generally is of a roller type to allow for the free movement of the container about the terminal. The slave pallet 12 is used to support and protect the container 18 in movement from a storage area to the palletizer 14.

It should be understood that the container 18 is generally formed of a lightweight material such as aluminum having end walls, side walls and top and bottom walls arranged to closely fit within the confines of the aircraft. As seen in FIG. 1, the container 18 may include an extension 19 which is sloped to the shape of the inside wall of the airplane. In order to maximize the storage area of the aircraft, the container is made slightly smaller that the interior of the aircraft. Since the container is made of aluminum, it is susceptible to damage if bumped and must, therefore, be capable of movement into and out of the aircraft with little difficulty. The pallet-palletizer assembly 10 of the present invention protects the container from damage by shippers or terminal personnel, as well as shipping or transporting hazards such as fork lift damage, wash boarding, dropping and racking.

The Slave Pallet

More particularly, the slave pallet 12 as seen in FIG. 2 generally includes a frame 20 having side members 22 and end members 24. A pair of hollow rectangular tine ways 26 are mounted in a parallel spaced relation between the side members 24 and are open at both ends to receive the tines of a fork lift truck 25.

Means are provided on the side members 24 for aligning the container 18 on the slave pallet 12. Such means is in the form of a pair of side plates 28 which are secured to the side plates 28 which are secured to the side members 24 and extend upwardly from the side members 24 a distance sufficient to engage the lower edges 29 at the bottom of the container 18. It should be noted that once the container 18 has been properly aligned on the slave pallet 12, it will be supported by the upper surfaces of the end members 22, the slide members 24 and the tine ways 26. One or more cross braces 30 can be provided between the tine ways 26 and the end members 22 to provide further support for the bottom of the container 18.

The underside of the extension 19 of the container 18 is protected from damage by means of a rail guard 32 which is secured to the ends of one of the side plates 28. The rail guard 32, as shown in the drawings, includes an outer square-shaped tubular element 34 and an inner V-shaped tubular element 36. A tubular brace 38 is provided between the V-shaped portion of the inner tubular frame 36. It should be understood that the rail guard 32 can be formed from materials other than tubes such as angle irons.

The Palletizer

The palletizer 14 includes a pair of rectangular frames 40 supported in a common plane by means of legs 42. The legs 42 may be omitted in cargo terminals where they are using a lower conveyor system, "low pro". The container 18 is supported on the palletizer 14 by means of a number of roller assemblies 44, 46 and 48 mounted on each of the frames 40. In this regard, each of the roller assemblies 44 and 48 includes a pair of rollers 50 supported by end brackets 52 on the frames 40. Each of the roller assemblies 46 includes a plurality of rollers 54 supported intermediate the roller assemblies 44 and 48 by means of end brackets 56.

The containers 18 are transferred from the pallet 12 to the palletizer 14 by means of the roller assemblies 44, 46 and 48. As seen in FIG. 3, this is accomplished by arranging the rollers 50 and 54 to project above the frame 40 a distance greater than the height of the tine ways 26. When the slave pallet 12 is positioned on the frame 40, the container 18 will rest on the rollers 50 and 54.

The slave pallet 2 is arranged so that it will seat on the frame 40 of the palletizer 14 with the roller assemblies 50 positioned in the spaces between the side members 22 and the tine ways 26. The roller assemblies 54 will be positioned in the spaces between the tine ways 26.

Means can be provided on one of the frames 40 for aligning the slave pallet 12 accurately on the palletizer 14. Such means is in the form of a pair of guide plates 60. The guide plates 60 are secured to the frame 40 in an angularly outwardly extending relation in the spaces between the roller assemblies 50 and the roller assemblies 54. When the slave pallet 12 is lowered onto the palletizer, the side members 24 will slide down on the guides 60 to position the side member 24 against the braces 52 and 56 for the roller assemblies 44, 46 and 48.

We claim:

1. A pallet palletizer assembly for positively locating a pallet in alignment with a conveyor, said assembly comprising a pallet and a palletizer, said pallet including a frame, a pair of tine ways located within said frame in a parallel spaced relation, said tine ways being open at the ends to receive the tines of a fork lift truck, said palletizer including a pair of rectangular frames, a number of roller assemblies mounted on each of said frames in parallel spaced relation to define spaces for receiving said tine ways, and means on one of said rectangular frames for guiding said pallet into the spaces between said roller assemblies, whereby said pallet can be seated on the palletizer frame below the level of the upper surfaces of the roller assembly and in alignment with the conveyor.

2. The assembly according to claim 1 wherein said pallet includes means on said frame for retaining the container in a fixed position on said pallet.

3. The assembly according to claim 1 including means on said frame for guarding the bottom of said container.

4. The assembly according to claim 1 wherein said each of said roller assemblies includes a plurality of rollers, said rollers being located a distance from said rectangular frames greater than the height of the tine ways.

5. A pallet palletizer assembly for transporting lightweight cargo containers, said assembly comprising:
    a pallet including a rectangular frame and a pair of enclosed tine ways mounted in a parallel spaced relation within said frame, said tine ways being open at the ends,
    and a palletizer including a supporting frame and a plurality of roller assemblies mounted on said supporting frame in parallel spaced relation, said roller assemblies having a height greater than the height of said tine ways, the tine ways on said pallet being spaced to seat on said supporting frame in the spaces between said roller assemblies,
    guides at one end of each space between said roller assemblies to positively align said pallet on said palletizer, whereby a container supported on said rectangular frame will be supported and positively located on said roller assemblies when said tine ways are seated on said support frame.

6. The assembly according to claim 5 wherein said rectangular frame and said tine ways provide a flat carrying surface for the containers.

7. The assembly according to claim 5 wherein said pallet includes a guard rail assembly for protecting a portion of the bottom of the container.

\* \* \* \* \*